United States Patent
Holub

(10) Patent No.: US 9,415,770 B2
(45) Date of Patent: Aug. 16, 2016

(54) EXITING VEHICLE TRANSPORT MODE USING FUEL LEVEL

(71) Applicant: Ford Global Technologies, LLC, Dearborn, MI (US)

(72) Inventor: Patrick Kevin Holub, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 511 days.

(21) Appl. No.: 14/039,350

(22) Filed: Sep. 27, 2013

(65) Prior Publication Data

US 2015/0094937 A1    Apr. 2, 2015

(51) Int. Cl.
  *B60W 20/00*  (2016.01)
  *F02D 28/00*  (2006.01)
  *B60W 50/035*  (2012.01)

(52) U.S. Cl.
  CPC ........... *B60W 20/108* (2013.01); *B60W 50/035* (2013.01); *F02D 28/00* (2013.01); *B60W 2540/06* (2013.01); *B60W 2560/02* (2013.01); *Y10S 903/944* (2013.01)

(58) Field of Classification Search
  CPC ............ B60W 2560/02; B60W 2560/06; B60W 50/035; B60W 2540/06
  USPC ........................................................ 307/10.7
  See application file for complete search history.

(56) References Cited

U.S. PATENT DOCUMENTS

| | | | | |
|---|---|---|---|---|
| 6,518,875 B2* | 2/2003 | DeZorzi | .............. | B60C 23/0408 340/438 |
| 7,171,300 B1 | 1/2007 | Anderson | | |
| 7,639,019 B2* | 12/2009 | Bosse | .............. | G01R 19/16542 320/104 |
| 8,269,641 B2* | 9/2012 | Bauman | ..................... | H02J 7/14 180/65.29 |
| 8,284,039 B2 | 10/2012 | Baker | | |
| 8,446,128 B2* | 5/2013 | Lickfelt | .................... | B60L 1/00 307/10.7 |
| 2009/0164071 A1* | 6/2009 | Takeda | .................. | B60W 10/18 701/48 |
| 2012/0143396 A1 | 6/2012 | Brunou | | |
| 2013/0146494 A1* | 6/2013 | Gilpatrick | ................ | B67D 7/04 206/459.1 |
| 2013/0249279 A1* | 9/2013 | Sogabe | ................... | B60R 16/03 307/9.1 |
| 2015/0088377 A1* | 3/2015 | Preusser | ............... | B60R 16/023 701/36 |

FOREIGN PATENT DOCUMENTS

| | | | | |
|---|---|---|---|---|
| DE | 102010015180 A1 | * | 12/2010 | ............. G01S 19/14 |
| JP | 2005083911 A | * | 3/2005 | |

OTHER PUBLICATIONS

Machine translations for the DE and JP references.*
Reading Off and Programming Vehicle Mode.

* cited by examiner

*Primary Examiner* — Fritz M Fleming
(74) *Attorney, Agent, or Firm* — Burgess Law Office, PLLC; Raymond I. Coppiellie

(57) ABSTRACT

A method for exiting the vehicle transport mode including placing the vehicle ignition in a predetermined position, monitoring the fuel level and exiting the vehicle transport mode when the fuel level exceeds a predetermined threshold. The method may also include the step of monitoring the inclination angle of the vehicle and maintaining the vehicle in the vehicle transport mode when the inclination angle exceeds a predetermined threshold.

16 Claims, 3 Drawing Sheets

EXITING VEHICLE TRANSPORT MODE USING FUEL LEVEL

CROSS-REFERENCE TO RELATED APPLICATIONS

Not Applicable.

BACKGROUND OF THE INVENTION

1. Field of the Invention

The present invention relates to a method for changing a vehicle operation status and, more particularly, to a method for exiting a vehicle transport mode.

2. Description of Related Art

Production passenger vehicles typically spend time in storage and in transit between the point of manufacture and delivery to a predetermined location, for example a vehicle dealership. Depending upon the length of time between manufacture and delivery to the dealership normal key-off electrical loads occurring in the vehicle may exceed battery capacity and drain the battery prior to the vehicle arriving at the dealership. To combat this concern vehicle manufacturers have developed low power key-off electrical modes specifically designed to preserve battery life during storage and transit. One low power key-off electrical mode is referred to as a transport mode wherein the electrical system of the vehicle has limited functionality while at the same time enabling the vehicle to be driven a short distance.

Prior to the customer taking delivery of the vehicle at the dealership or other predetermined location, the transport mode must be exited and the vehicle placed in a normal operating mode. In order to exit the transport mode different operations or steps are required. For example, one method of exiting the vehicle transport mode may require an operator to press the brake pedal multiple times while cycling the vehicle hazard switch for a predetermined time period. An additional method includes checking vehicle mileage to determine if a threshold has been exceeded. In some cases the mileage check is automatically done by an on-board electronic module. The vehicle mileage threshold must be large enough to withstand the highest typical pre-delivery mileage including road test mileage by plant personnel. This method limits any transport or test drives to a short distance in order to maintain the vehicle in transport mode. The high mileage threshold limits this method to a backup method rather than a primary method. Other steps or procedures may also be used to exit or transfer a vehicle from a transport mode to a normal operating mode.

Such steps or procedures can be complicated and may increase the overall labor that must be completed as part of a pre-delivery inspection and vehicle preparation. If such steps or procedures are not completed satisfactorily they can create quality issues for the manufacturer and dealer.

SUMMARY OF THE INVENTION

Accordingly, an embodiment of the present invention provides a method for exiting a vehicle transport mode including placing the vehicle ignition in a predetermined position, monitoring the fuel level and exiting the vehicle transport mode when the fuel level exceeds a predetermined threshold. In one embodiment of the invention the fuel level threshold exceeds ninety percent of the fuel fill level. A further embodiment includes the step of monitoring the inclination angle of the vehicle and maintaining the vehicle in a vehicle transport mode when the inclination angle exceeds a predetermined threshold.

DETAILED DESCRIPTION OF THE PREFERRED EMBODIMENTS

The following description of the preferred embodiment(s) is merely exemplary in nature and is in no way intended to limit the invention, its application, or uses.

As used herein, the term "vehicle transport mode" generally refers to a low, key-off, electrical load mode of operation used to preserve battery life during storage and transit of the vehicle. Typically, various electrical components are rendered inoperative. The low, key-off, electrical load mode of operation is exited prior to vehicle delivery to the customer or consumer to restore full vehicle functionality. This may also be referred to as battery saver mode or shipping mode. It is possible to drive or operate the vehicle for short distances while in the transport mode; for example, loading and unloading the vehicle from a transport vehicle. The term "normal mode" refers to a mode where in the electrical system in the vehicle is fully functional, that is the mode in which the vehicle is normally used. As part of a pre-delivery inspection and vehicle preparation of a vehicle dealer will take steps to exit the transport mode and place the vehicle into normal mode. In some cases, the message may appear in the vehicle instrument cluster or message center stating that the vehicle is in transport mode.

Figure 1:
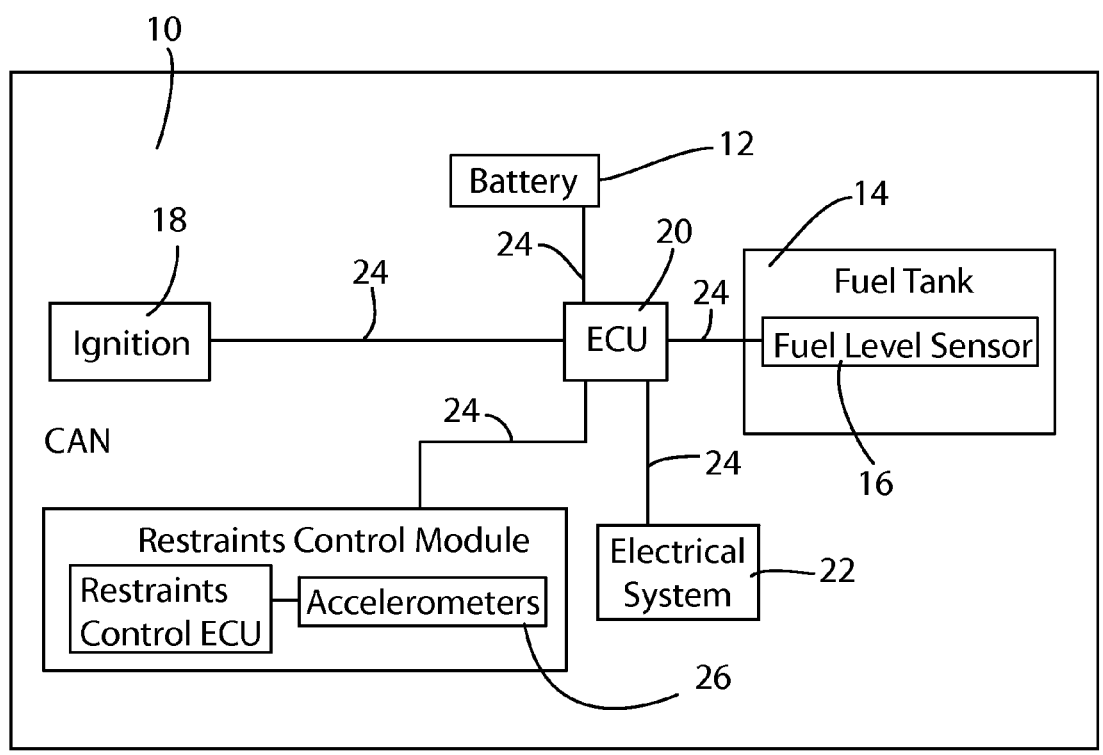
FIG. 1 is a schematic diagram showing an exemplary system of a vehicle according to one embodiment.

FIG. 1 illustrates an exemplary system according to one aspect of the present invention includes a motor vehicle, seen schematically at 10, including a battery 12, a fuel tank 14, a fuel tank sensor 16 operative to monitor and determine the level of fuel in the fuel tank 14, a vehicle ignition 18, an electronic control unit (ECU) 20 and a vehicle electrical system 22 all operatively connected by a controller area network (CAN) bus 24. The ECU 20 can be programmed to place the vehicle electrical system 22 in a transport mode to reduce power consumption and thereby preserve battery life while providing the vehicle 10 with limited functionality; for example, the vehicle 10 may be driven short distances. Such as, from a manufacturing facility to a storage facility, and from the storage facility to a transport vehicle or car-hauler whereby the vehicle is transported to a vehicle dealership.

Figure 2:
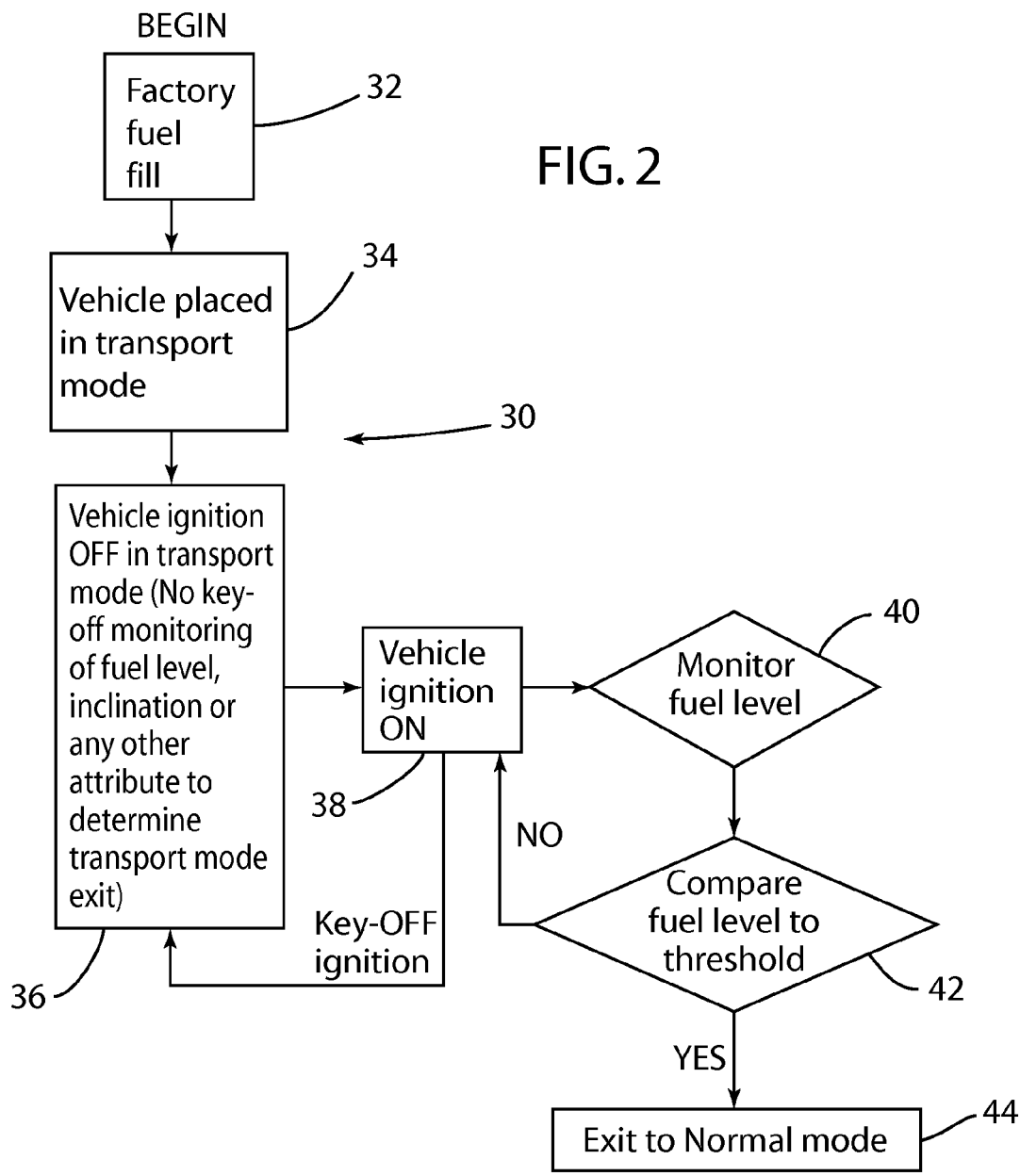
FIG. 2 is a flow chart showing an exemplary process for exiting a vehicle transport mode in accordance with one embodiment of the disclosed subject matter.

Turning to FIG. 2, initially, as shown in block 32, during the manufacturing process or on completion of the assembly process, fuel is deposited in the fuel tank 14 in order to check operation of the vehicle 10. The vehicle factory fuel fill or amount of fuel deposited in the fuel tank 14 is minimized as much as possible to minimize vehicle 10 shipping weight and costs. Often the vehicle 10 contains no more fuel than that required to prevent fuel pickup problems on transport or car-hauler loading ramps. The vehicle is then filled with fuel after it reaches its destination, that is once offloaded from the transport or car-hauler and delivered to the dealership or other predetermined location. In addition, as shown in block 34, during or after completion of the factory build process the vehicle is placed in the transport mode.

Starting with block 36, FIG. 2 illustrates a flow chart 30 of an exemplary process for exiting a vehicle transport mode. Initially, block 36 illustrates the vehicle ignition 18 in an off position with the vehicle 10 in transport mode; that is no key-off monitoring of fuel level, inclination or any other attribute to determine transport mode exit. In this step, no monitoring occurs and therefore it requires no extra key-off electrical load since transport mode is designed to reduce key-off electrical loads and preserve the battery.

As illustrated in FIG. 2, generally the method enables monitoring of the existing fuel level CAN signal, which can be obtained from the fuel tank 14, when the vehicle ignition 18 is placed in a predetermined position, for example a run position illustrated in block 38. The ECU 20 using specific logic determines the fuel fill state and compares it with a predetermined threshold level. In one embodiment, the predetermined threshold level is when the fuel tank 14 is greater than ninety percent (90%) full. Thus, when the fuel fill sensor 16 indicates that the fuel tank 14 has a fill level greater than ninety percent (90%) full the ECU 20 operates to exit the vehicle transport mode. Accordingly, the process or procedure for exiting the transport mode into the normal mode is accomplished based on the fuel fill level rather than the additional dedicated labor steps currently required.

Turning again to FIG. 2, block 38 illustrates the step of placing the vehicle ignition in a predetermined position; for example a run position, an on position or an accessory position when the vehicle 10 is in the transport mode. Further, with keyless or push button ignitions, the key/fob may have to be placed in or near a particular location.

Block 38 may also include a step wherein the method includes a determination of whether the vehicle is in the transport mode or already in the normal mode. It is contemplated that the vehicle 10 will automatically exit the transport mode and once exited will not return to the transport mode absent specific programming. Thus, once placed in the normal mode the ECU 20 will automatically skip the transport mode analysis or subroutine each time the vehicle ignition 18 is placed in the predetermined position.

Block 40 illustrates the step wherein the method monitors and obtains the fuel fill level in the vehicle fuel tank. One method of monitoring and obtaining the fuel fill level can be accomplished by monitoring the existing fuel level signal through the Controller Area Network (CAN) bus when the ignition is placed in a predetermined position thereby obtaining the fuel fill level from the fuel tank sensor 16.

Block 42 illustrates the step of comparing the fuel fill level with a predetermined fuel fill level amount and exiting the transport mode to the normal mode when the fuel fill level exceeds the predetermined fuel fill level as illustrated in block 44. While the predetermined threshold level fuel level in the fuel tank 14 was greater than ninety percent (90%) full this is an example and is not limiting. Other fuel levels in the fuel tank 14 can also be used. As illustrated in block 42 when the fuel fill does not exceed the predetermined fuel fill threshold level the system returns to block 38 and maintains the vehicle in the transport mode with the vehicle ignition placed in the "on" position. For example, when the vehicle 10 is moved from a storage facility to the vehicle transport or car-hauler. Whereby when the vehicle ignition is placed in the "off" position the vehicle remains in the transport mode as illustrated in block 36.

Figure 3:
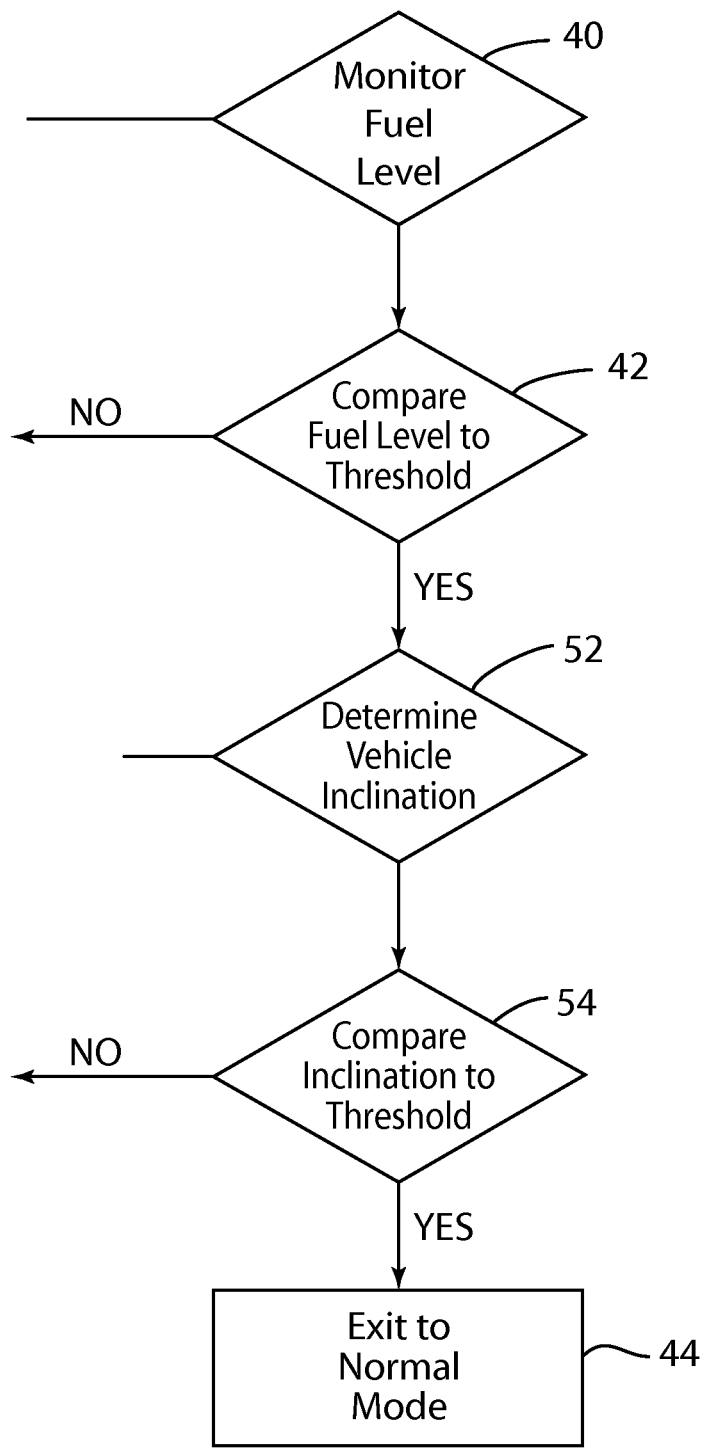
FIG. 3 is a flow chart showing an exemplary process for exiting a vehicle transport mode in accordance with a further embodiment of the disclosed subject matter.

FIG. 3 illustrates a flow chart 50 of an exemplary process for an additional embodiment of exiting a vehicle transport mode. The system may include a vehicle inclination or angle sensor, illustrated in FIG. 1 as an accelerometer 26. The vehicle inclination or angle sensor may include or be part of the vehicle stability system. For example instead of having a separate dedicated sensor, input from existing vehicle stability sensors can be used to determine the inclination or angle of the vehicle. Specifically, the accelerometers 26 of the vehicle restraints control module could be used to determine vehicle inclination. Accordingly, a single sensor or multiple sensors may monitor several parameters including one of or both the "pitch," that is the rotation about the lateral (left to right) axis, commonly referred to as the 'Y' axis and the "roll," that is the rotation about the longitudinal (front to rear) axis, commonly (but not always) referred to as the 'X' axis by vehicle designers. Vehicle inclination or angle is measured to compensate for erroneous or false fuel fill readings occurring during high inclination situations. For example during transport the vehicle ignition may be placed in the run position when the vehicle is loaded onto or removed from a transport vehicle or car-hauler, typically in a high incline situation.

Turning again to FIG. 3, the flow chart 50 of the additional embodiment includes block 52 that illustrates the step of checking, monitoring or determining the inclination angle of the vehicle.

Block 54 illustrates the step of comparing the inclination angle of the vehicle to a predetermined inclination angle and exiting the transport mode when the inclination angle of the vehicle is less than the predetermined inclination angle. Specifically, block 54 determines if the angle of the vehicle is below the predetermined inclination angle threshold. If the answer is yes, the angle of the vehicle 10 is below the predetermined inclination angle than, as illustrated in block 44, the vehicle exits the transport mode to the normal mode. If, however the answer is no, the inclination angle of the vehicle is not less than the predetermined inclination angle the system returns to block 38 wherein the vehicle 10 remains in the transport mode albeit with the vehicle ignition 18 in the "on" position. Thus, should the vehicle 10 be positioned in a high angle situation, that is it exceeds the predetermined inclination angle, wherein the fuel sensor may read erroneously then the method prevents the vehicle from exiting the transport mode and being placed in the normal mode. For example, the vehicle would not exit transport mode when an operator started the vehicle either loaded it onto or removed it from a transport vehicle or car-hauler. Instead, it would be unable to exit the transport mode until the vehicle was placed in a suitable orientation, for example substantially horizontal.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of exiting a vehicle transport mode comprising:
   placing a vehicle ignition in a predetermined position;
   monitoring a fuel level of a vehicle; and
   exiting the vehicle transport mode when said fuel level exceeds a predetermined threshold.

2. The method as set forth in claim 1 wherein said fuel level threshold exceeds ninety percent of the filled fuel level of a vehicle fuel tank.

3. A method as set forth in claim 1 including the step of exiting the transport mode into a normal mode.

4. A method as set forth in claim 1 wherein said transport mode includes an electrical system in the vehicle having limited functionality to reduce power consumption and thereby preserve battery life.

5. A method as set forth in claim 1 wherein said normal mode includes an electrical system in the vehicle having full functionality.

6. A method as set forth in claim 1 including monitoring the inclination of a vehicle.

7. A method as set forth in claim 6 including the step of using at least one vehicle sensor to determine the inclination of the vehicle.

8. A method as set forth in claim 6 including the steps of:
determining the inclination angle of the vehicle;
comparing the inclination angle to a predetermined threshold; and
maintaining the vehicle in the transport mode when the inclination angle exceeds the predetermined threshold.

9. A method as set forth in claim 8 including the step of monitoring vehicle stability sensors to determine the inclination angle of the vehicle.

10. A method of exiting a vehicle transport mode comprising the steps of:
placing a vehicle ignition in a predetermined position;
detecting if the vehicle is placed in a transport mode;
monitoring the fuel level of the vehicle; and
exiting the transport mode based on the fuel level.

11. A method as set forth in claim 10 including the step of exiting the transport mode and entering a normal operating mode.

12. A method as set forth in claim 10 including the steps of:
checking vehicle inclination; and
maintaining the vehicle in the transport mode based on vehicle inclination.

13. A method as set forth in claim 10 including the step of establishing a fuel level threshold and exiting the transport mode when the fuel level exceeds the fuel level threshold.

14. A method as set forth in claim 13 including the steps of:
determining the inclination angle of the vehicle;
comparing the inclination angle to a predetermined threshold; and
overriding the exit into the transport mode and maintaining the vehicle in the transport mode when the inclination angle exceeds the predetermined threshold.

15. A method of transporting a vehicle placed in a vehicle transport mode and exiting the vehicle transport mode after arriving at a preselected location including the steps of:
providing the vehicle with an initial low fuel level during transport;
filling the vehicle with fuel at the preselected location to a fuel fill level exceeding the initial low fuel level;
placing an ignition switch in predetermined position;
monitoring the fuel level; and
exiting the transport mode if the fuel level exceeds a predetermined threshold level.

16. A method as set forth in claim 15 including the steps of:
monitoring vehicle inclination; and
maintaining the vehicle in the transport mode if the angle of inclination exceeds a predetermined threshold.

* * * * *